US010822235B2

(12) United States Patent
Zydowicz et al.

(10) Patent No.: US 10,822,235 B2
(45) Date of Patent: Nov. 3, 2020

(54) HYDROGEN PEROXIDE PURIFICATION PROCESS AND HYDROGEN PEROXIDE

(71) Applicant: ARKEMA FRANCE, Colombes (FR)

(72) Inventors: Philippe Zydowicz, Saint Priest (FR); Benoit Requieme, Saint-Georges-de-Commiers (FR); Michel Jauffret, Montchaboud (FR)

(73) Assignee: ARKEMA FRANCE, Colombes (FR)

( * ) Notice: Subject to any disclaimer, the term of this patent is extended or adjusted under 35 U.S.C. 154(b) by 334 days.

(21) Appl. No.: 15/318,313

(22) PCT Filed: Jun. 26, 2015

(86) PCT No.: PCT/FR2015/051732
§ 371 (c)(1),
(2) Date: Dec. 12, 2016

(87) PCT Pub. No.: WO2016/001539
PCT Pub. Date: Jan. 7, 2016

(65) Prior Publication Data
US 2017/0113932 A1 Apr. 27, 2017

(30) Foreign Application Priority Data
Jun. 30, 2014 (FR) ...................... 14 56165

(51) Int. Cl.
*C01B 15/013* (2006.01)
*B01D 61/02* (2006.01)

(52) U.S. Cl.
CPC .......... *C01B 15/013* (2013.01); *B01D 61/022* (2013.01); *B01D 2311/04* (2013.01); *B01D 2311/2626* (2013.01)

(58) Field of Classification Search
None
See application file for complete search history.

(56) References Cited

U.S. PATENT DOCUMENTS

| 4,879,043 A * | 11/1989 | Boughton | B01D 61/025 210/651 |
| 5,055,286 A * | 10/1991 | Watanabe | C01B 15/013 423/584 |
| 5,200,166 A * | 4/1993 | Shiga | C01B 15/0135 423/584 |
| 5,906,738 A * | 5/1999 | Morisaki | B01D 61/025 210/257.2 |
| 6,333,018 B2 | 12/2001 | Piero et al. | |
| 2012/0141357 A1* | 6/2012 | Zhan | B01D 61/025 423/584 |
| 2012/0148485 A1* | 6/2012 | Morrow | C01B 3/384 423/650 |

FOREIGN PATENT DOCUMENTS

| JP | 2003 001070 A | 1/2003 |
| JP | 2004 089962 A | 3/2004 |
| WO | WO 2005/033005 | 4/2005 |
| WO | WO 2016/001539 A1 | 1/2016 |

OTHER PUBLICATIONS

International Search Report dated Sep. 23, 2015, by the European Patent Office as the International Searching Authority for International Application No. PCT/FR2015/051732.

* cited by examiner

*Primary Examiner* — Melissa S Swain
(74) *Attorney, Agent, or Firm* — Buchanan Ingersoll & Rooney P.C.

(57) ABSTRACT

A hydrogen peroxide purification process, including supplying a starting stream containing hydrogen peroxide at a content above 50 wt %, as well as at least one stabilizer; a single step of purification of the starting stream, the single step having purification by reverse osmosis; collecting a purified stream at the end of said single purification step, in which purification by reverse osmosis includes: passing the starting stream over a first membrane; collecting a permeate and a retentate from the first membrane; passing the permeate from the first membrane over a second membrane; collecting a permeate and a retentate from the second membrane, the purified stream having the permeate from the second membrane.

13 Claims, No Drawings

HYDROGEN PEROXIDE PURIFICATION PROCESS AND HYDROGEN PEROXIDE

FIELD OF THE INVENTION

The present invention relates to a hydrogen peroxide purification process and a hydrogen peroxide solution.

TECHNICAL BACKGROUND

Hydrogen peroxide is a product used in various industrial applications, notably in electronics and in the food-processing industry.

The existing processes for production of hydrogen peroxide lead to the presence of impurities or of mineral or organic contaminants at low concentration in the product. Moreover, owing to the corrosive nature of hydrogen peroxide with respect to many metallic materials, transport or storage of hydrogen peroxide may be accompanied by an increase in contaminants such as Fe, Cu, Mn or Cr.

In general, the contaminants present in a hydrogen peroxide solution may be catalysts of the decomposition of hydrogen peroxide.

The use of stabilizers to limit the decomposition of hydrogen peroxide is known. Purification of hydrogen peroxide in order to reduce the content of contaminants, for example by distillation or filtration on resins or on membranes, is also known.

Thus, document U.S. Pat. No. 4,879,043 describes the use of reverse osmosis for purifying a hydrogen peroxide stream having a strength from 5 to 50 wt %.

Document U.S. Pat. No. 6,333,018 describes the use of reverse osmosis for purifying a hydrogen peroxide stream having a strength from 60 to 70 wt %, in the absence of stabilizers.

Document WO 2005/033005 describes purification of hydrogen peroxide in at least two steps, for example a step of reverse osmosis and then a step of contacting with an adsorption resin.

In actual fact, the specifications desired for hydrogen peroxide vary depending on the industrial applications. Thus, for regulated applications, in cosmetics, pharmacy or food processing, very high purity is required. However, for mass-market applications (in chemistry, or in the production of paper pulp), the hydrogen peroxide produced commonly has a far higher content of contaminants.

However, there is a need for an intermediate grade, for example in the field of the production of per acids, notably peracetic acid.

In other words, some improvement is desired in the purity of hydrogen peroxide of the type used for mass-market applications, with a relatively low cost price and using a simple process, without employing the complex techniques used for the regulated applications.

SUMMARY OF THE INVENTION

The invention relates firstly to a hydrogen peroxide purification process, comprising:
supplying a starting stream containing hydrogen peroxide at a content above 50 wt %, as well as at least one stabilizer;
a single step of purification of the starting stream, said single step consisting of purification by reverse osmosis;
collecting a purified stream at the end of said single purification step,
in which purification by reverse osmosis comprises:
passing the starting stream over a first membrane;
collecting a permeate and a retentate from the first membrane;
passing the permeate from the first membrane over a second membrane;
collecting a permeate and a retentate from the second membrane, the purified stream consisting of the permeate from the second membrane.

According to one embodiment, the starting stream is prepared by a process comprising passage over adsorption resin.

According to one embodiment, the starting stream contains at least 55 wt %, preferably at least 60 wt %, of hydrogen peroxide.

According to one embodiment, the stabilizer is selected from phosphate or pyrophosphate salts, tin salts, organophosphorus compounds and notably phosphonates, carboxylic acids, borates, nitrates and combinations of the latter, the stabilizer preferably being a mixture of sodium pyrophosphate and sodium stannate.

According to one embodiment, purification by reverse osmosis comprises:
passing the starting stream over a single membrane;
collecting a permeate and a retentate from the membrane, the purified stream consisting of the permeate.

According to one embodiment, purification by reverse osmosis comprises:
passing the starting stream over a first membrane;
collecting a permeate and a retentate from the first membrane;
passing the permeate from the first membrane over a second membrane;
collecting a permeate and a retentate from the second membrane, the purified stream consisting of the permeate from the second membrane.

According to one embodiment, purification by reverse osmosis is carried out on a membrane of the polyamide, polypiperazine, polyacrylonitrile or polysulfone type, and preferably on a polyamide membrane on a polysulfone support.

According to one embodiment, the purified stream contains:
less than 100 mg/kg of total organic carbon;
less than 5 mg/kg of phosphorus;
less than 0.04 mg/kg of iron; and
less than 0.1 mg/kg of the sum of chromium and nickel.

According to one embodiment, purification of the starting stream employs one or more membranes, said membranes being used for a time greater than or equal to 1 week, preferably greater than or equal to 2 weeks, or greater than or equal to 3 weeks, or greater than or equal to 4 weeks.

The invention also relates to a solution containing more than 50 wt % of hydrogen peroxide, also containing at least one stabilizer, and containing:
less than 100 mg/kg of total organic carbon;
less than 5 mg/kg of phosphorus;
less than 0.04 mg/kg of iron; and
less than 0.1 mg/kg of the sum of chromium and nickel.

According to one embodiment, the solution contains at least 55 wt %, preferably at least 60 wt %, of hydrogen peroxide.

According to one embodiment, the stabilizer is selected from phosphate or pyrophosphate salts, tin salts, organophosphorus compounds and notably phosphonates, carboxylic acids, borates, nitrates and combinations of the latter, the stabilizer preferably being a mixture of sodium pyrophosphate and sodium stannate.

According to one embodiment, the content of stabilizer is between 5 and 50 mg per kg of solution.

The present invention overcomes the drawbacks of the prior art. More particularly, it makes it possible to produce hydrogen peroxide having specifications intermediate between those of the mass-market applications and those of the regulated applications, at low cost price and with a relatively simple process.

DESCRIPTION OF EMBODIMENTS OF THE INVENTION

The invention will now be described in more detail in the following nonlimiting description.

Unless stated otherwise, all the concentrations or contents mentioned are values by weight.

The invention specifies supplying a starting stream containing hydrogen peroxide at a content above 50 wt %. This starting stream has preferably come directly from a hydrogen peroxide production unit, and has not undergone prior purification other than optionally passage over adsorption resin during its production. It is an aqueous solution of hydrogen peroxide.

The invention is advantageously applied to starting streams containing at least 52%, at least 55%, at least 58%, at least 60%, at least 62% or at least 65% of hydrogen peroxide.

The starting stream contains at least one stabilizer. This stabilizer is generally added directly at the outlet of the production unit. The stabilizer content varies from 1 to 400 mg/kg, preferably from 5 to 300 mg/kg.

As stabilizer, we may use for example phosphate or pyrophosphate salts, tin salts, organophosphorus compounds and notably phosphonates, carboxylic acids, borates, nitrates or combinations of the latter. The preferred stabilizer is a mixture of sodium pyrophosphate and sodium stannate containing 1 to 150 mg of each stabilizer per kg of product, preferably from 15 to 100 mg of each stabilizer per kg of product, preferably from 20 to 110 mg of each stabilizer per kg of product, preferably from 25 to 120 mg of each stabilizer per kg of product.

The invention specifies a single step of purification of the starting stream, which is a reverse osmosis purification step. Thus, the invention excludes the presence of steps of purification by another technique, such as steps of distillation, ion exchange, exposure to ozone or to ultraviolet radiation, ultrafiltration or nanofiltration, etc.

The reverse osmosis purification step may comprise a single passage over a reverse osmosis membrane, or a succession of several passages over reverse osmosis membranes, notably a succession of two or three passages over reverse osmosis membranes.

The succession of several passages over reverse osmosis membranes may be carried out by arranging reverse osmosis units in series. Of course, it is also possible to arrange reverse osmosis units in parallel, depending on the desired flow rate.

The reverse osmosis membranes used in the context of the invention are semipermeable membranes of the polyamide, polypiperazine, polyacrylonitrile or polysulfone type, and preferably are polyamide membranes on a polysulfone support.

Each step of passage over a reverse osmosis membrane makes it possible to collect a permeate and a retentate, the permeate being the fraction depleted of contaminants. Passage over the membrane is forced by applying a suitable pressure.

The retentate, enriched in contaminants, may also be utilized, for example in the form of hydrogen peroxide corresponding to lower specifications. If only part of the starting stream is purified, it is thus possible to mix the retentate with the other part (not submitted to purification) of the starting stream.

The permeation stream may for example be between 10 and 200 L/h·m$^2$, preferably between 20 and 180 L/h·m$^2$, preferably between 50 and 150 L/h·m$^2$. The pressure may for example be between 10 and 80 bar, preferably between 15 and 70 bar, preferably between 25 and 40 bar. The VCF (Volume Concentration Factor, calculated as the ratio of the feed flow rate to the retentate flow rate) may for example be between 1 and 10, preferably between 1.2 and 8, preferably between 1.5 and 5, preferably between 2 and 4.

One problem that arises in the reverse osmosis purification of hydrogen peroxide streams is that hydrogen peroxide has a tendency to attack the membranes chemically, especially when it is present at a high concentration. Thus, document U.S. Pat. No. 4,879,043 teaches the use of reverse osmosis only for streams containing less than 50% of hydrogen peroxide.

The present inventors found that the life of certain membranes in the presence of a stream containing more than 50% of hydrogen peroxide does not exceed a few hours or days. However, certain membranes have a higher resistance to hydrogen peroxide and may be used continuously for at least 1, 2, 3 or even 4 weeks.

EXAMPLES

The following example illustrates but does not limit the invention.

This example compares the content of various contaminants in a solution S containing 60% of hydrogen peroxide stabilized with 110 mg of sodium pyrophosphate and 30 mg of sodium stannate (expressed as $Na_2SnO_3 \cdot 3H_2O$) per kg of solution, before and after purification by reverse osmosis (in a single step or in two steps, notation "OI") using a KOCH TFC-XR reverse osmosis membrane, in the following operating conditions: pressure: 35 bar, temperature: 22° C., VCF: 2.5, permeation stream: 70 L/h·m$^2$. The starting solution tested S has specifications typical of a mass-produced hydrogen peroxide. The solution S was prepared by a process comprising passage over adsorption resin.

Specifications commonly used for producing peracetic acid are also indicated. The results are given in the following table ("TOC" denotes: total organic carbon).

The contents of metals were determined by the methods described in standards NF EN ISO 17294-2 and NF EN ISO 11885; TOC was determined by the method described in standard NF EN 1484.

|  | S | S + 1 step OI | S + 2 steps OI | Example of specifications |
| --- | --- | --- | --- | --- |
| TOC (mg/kg) | 240 | 100 | 40 | <100 |
| P (mg/kg) | 45 | 9 | 2 | <5 |
| Fe (mg/kg) | 0.3 | 0.05 | 0.03 | <0.04 |
| Sn (mg/kg) | 13.5 | 0.7 | 0.03 | — |
| Cr + Ni (mg/kg) | 0.15 | <0.1 | <0.1 | <0.1 |

The invention claimed is:

1. A hydrogen peroxide purification process, comprising:
supplying a starting stream, wherein the starting stream comprises hydrogen peroxide at a content above 50 wt %, and at least one stabilizer;
purifying the starting stream by reverse osmosis,
wherein the purifying consists essentially of:
passing the starting stream over a first membrane;
collecting a permeate and a retentate from the first membrane;
passing the permeate from the first membrane over a second membrane; and
collecting a permeate and a retentate from the second membrane, wherein the purified stream consists of the permeate from the second membrane, and
wherein the purification process excludes the presence of ion exchange steps.

2. The process as claimed in claim 1, wherein the starting stream is prepared by a process comprising passing the starting stream over an adsorption resin.

3. The process of claim 1, wherein the starting stream comprises at least 55 wt % of hydrogen peroxide.

4. The process of claim 1, wherein the stabilizer is selected from phosphate or pyrophosphate salts, tin salts, organophosphorus compounds and phosphonates, carboxylic acids, borates, nitrates and combinations of the latter.

5. The process of claim 1, wherein the first membrane is of the polyamide, polypiperazine, polyacrylonitrile or polysulfone type.

6. The process of claim 1, wherein the purified stream comprises:
less than 100 mg/kg of total organic carbon;
less than 5 mg/kg of phosphorus;
less than 0.04 mg/kg of iron; and
less than 0.1 mg/kg of the sum of chromium and nickel.

7. The process of claim 1, wherein the first membrane and the second membrane are used for greater than or equal to 1 week.

8. The process of claim 1, wherein the purification process form a solution comprising at least 55 wt % of hydrogen peroxide, at least one stabilizer,
less than 100 mg/kg of total organic carbon;
less than 5 mg/kg of phosphorus;
less than 0.04 mg/kg of iron; and
less than 0.1 mg/kg of the sum of chromium and nickel.

9. The process of claim 8, wherein the stabilizer is selected from phosphate or pyrophosphate salts, tin salts, organophosphorus compounds and phosphonates, carboxylic acids, borates, nitrates and combinations of the latter.

10. The process of claim 8, wherein the content of stabilizer is between 5 and 50 mg per kg of solution.

11. The process of claim 1, comprising supplying the starting stream directly from a hydrogen peroxide production unit.

12. The process of claim 11, wherein the starting stream is passaged over an adsorption resin in the hydrogen peroxide production unit before being supplied to the hydrogen peroxide purification process.

13. The process of claim 1, wherein the starting stream is passaged over an adsorption resin in a hydrogen peroxide production unit before being supplied to the hydrogen peroxide purification process.

* * * * *